(12) United States Patent
Wagner et al.

(10) Patent No.: US 8,146,729 B1
(45) Date of Patent: Apr. 3, 2012

(54) AUTOMATED ELEVATOR LOADING AND UNLOADING SYSTEM

(75) Inventors: Jeffrey Paul Wagner, Bridport, VT (US); Lloyd L. Ellison, Jr., Fairfax, VT (US); James Michael Haley, So. Burlington, VT (US); Robert Merrill Alsop, Fairfax, VT (US)

(73) Assignee: General Dynamics Armament and Technical Products, Inc., Charlotte, NC (US)

( * ) Notice: Subject to any disclaimer, the term of this patent is extended or adjusted under 35 U.S.C. 154(b) by 399 days.

(21) Appl. No.: 12/479,315

(22) Filed: Jun. 5, 2009

Related U.S. Application Data (60) Provisional application No. 61/061,148, filed on Jun. 13, 2008.

(51) Int. Cl.
*B65G 1/06* (2006.01)
(52) U.S. Cl. .................................... 198/369.6; 414/278
(58) Field of Classification Search ............... 198/369.6; 414/278
See application file for complete search history.

(56) References Cited

U.S. PATENT DOCUMENTS

| | | | | |
|---|---|---|---|---|
| 3,567,039 A | * | 3/1971 | Evans | 211/162 |
| 3,595,415 A | * | 7/1971 | Herd | 414/652 |
| 3,750,804 A | * | 8/1973 | Lemelson | 414/276 |
| 3,805,974 A | * | 4/1974 | Andersson et al. | 414/276 |
| 4,586,684 A | * | 5/1986 | Carter et al. | 244/137.1 |
| 5,441,141 A | * | 8/1995 | Bonnet | 198/370.03 |
| 5,664,929 A | * | 9/1997 | Esaki et al. | 414/398 |
| 6,394,257 B1 | * | 5/2002 | Wheeler | 198/369.6 |
| 6,588,608 B2 | * | 7/2003 | Pater | 211/151 |
| 2003/0168313 A1 | * | 9/2003 | Hiroki | 198/369.6 |
| 2006/0182552 A1 | * | 8/2006 | Jiang et al. | 414/278 |

* cited by examiner

*Primary Examiner* — Mark A Deuble
(74) *Attorney, Agent, or Firm* — Hunton & Williams LLP (57) ABSTRACT

Systems and methods in accordance with exemplary embodiments for assisting cargo onto and from elevators. The system may include deck subsystems comprising rollers, a motor, and a gearbox. The motor may drive the gearbox which may drive the rollers to assist in loading cargo onto an elevator and/or assist in unloading cargo from an elevator. Deck subsystems may be located on multiple deck levels. The system may include an elevator subsystem having rollers. The deck subsystem may include a telescopic driveshaft which may extend and drive the rollers on the elevator subsystem to assist in loading and/or unloading cargo onto and from the elevator subsystem.

18 Claims, 11 Drawing Sheets

AUTOMATED ELEVATOR LOADING AND UNLOADING SYSTEM

This application claims priority from U.S. Provisional Patent Application No. 61/061,148, filed on Jun. 13, 2008, which is incorporated herein by reference in its entirety.

FIELD OF INVENTION

The invention is directed towards elevator systems and methods and more specifically towards systems and methods for assisting in the loading of cargo onto an elevator at multiple deck levels and/or the unloading of cargo off of the elevator at multiple deck levels.

BACKGROUND INFORMATION

The loading and unloading of a ship is a time consuming process. For example, the loading of ordnance and supplies of a Navy ship is time consuming and requires a large amount of manpower. Typically, elevator delays are a significant reason for lengthening this process. For example, when one elevator is being loaded, that elevator is not available at other decks of the ship. Similarly, when the loaded elevator reaches the desired deck on one level, that elevator is not available at other decks on other levels. Thus, the loading and unloading of a conventional elevator causes significant delays in the loading and/or unloading of a ship. In addition, delays can occur when an elevator carrying supplies reaches a desired floor but cannot be unloaded in a timely manner. For example, a forklift is unavailable to assist with the unloading of the supplies. Although the above description is directed at elevator systems within ships, this problem may also be applicable to elevators not located on a ship, such as freight elevators in a building.

SUMMARY OF THE INVENTION

In view of the foregoing, one or more embodiments include a system that may assist in the loading and/or unloading of cargo on and/or off of an elevator. The system may include a motor coupled to a set of rollers adjacent to the elevator and/or a set of rollers in the elevator, and the motor may drive the roller to load and/or unload the elevator.

At least one embodiment provides a system having an elevator subsystem positioned on an elevator and a deck subsystem positioned on a deck. The elevator subsystem may comprise a plurality of rollers. The deck subsystem may comprise a plurality of rollers, a motor, and a gearbox operatively coupled to the motor and to the plurality of rollers on the deck subsystem. The motor may drive the gearbox which causes the plurality of rollers on the deck subsystem to rotate, whereby the rotation of the rollers assists in loading or unloading cargo to and from the elevator subsystem. The system may include a telescoping driveshaft operatively coupled to an elevator driveshaft with the motor causing the elevator driveshaft to rotate which causes the plurality of rollers on the elevator subsystem to rotate thereby assisting in loading or unloading cargo to and from the elevator subsystem. Deck subsystems may be located on multiple deck levels.

At least one embodiment provides a method comprising rotating a plurality of rollers on a deck subsystem to move cargo from a first end of the deck subsystem to a second end of the deck subsystem, with the deck subsystem positioned outside of an elevator, lowering a gap bridge to span a gap between the deck subsystem and an elevator subsystem, with the elevator subsystem positioned within an elevator and comprising a plurality of rollers, and rotating the rollers on the deck subsystem and the rollers on the elevator subsystem thereby moving the cargo from the deck subsystem over the gap bridge and onto the elevator subsystem.

At least one embodiment provides a method comprising lowering a gap bridge to span a gap between a deck subsystem and an elevator subsystem, with the deck subsystem positioned outside of an elevator and comprising a plurality of rollers and the elevator subsystem positioned within an elevator and comprising a plurality of rollers, and rotating rollers on the deck subsystem and the rollers on the elevator subsystem to move cargo from the elevator subsystem to the deck subsystem.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description is exemplary and explanatory only and is not restrictive. The exemplary systems and methods discuss loading and unloading "cargo." It should be appreciated that as used herein, "cargo" may refer to materiel, loads, supplies, palletized loads (cargo on a pallet), JMICs (Joint Modular Intermodal Containers), and/or other types of containerized or non-containerized loads or supplies.

Generally speaking, the automated elevator loading and unloading (AELU) system of the various exemplary embodiments described herein has a deck subsystem comprising a plurality of rollers, an elevator subsystem comprising a plurality of rollers, a gap bridge which may span the gap between the deck subsystem positioned outside of an elevator and the elevator subsystem positioned inside of an elevator with a motor operatively coupled to the rollers of the deck subsystem and operatively coupled to the rollers of the elevator subsystem, and the motor causing the rollers on the deck subsystem and the rollers on the elevator subsystem to rotate thereby moving cargo from the deck subsystem onto the elevator subsystem and/or moving cargo from the elevator subsystem onto the deck subsystem. Deck subsystems may be located on multiple deck levels.

The various exemplary embodiments generally describe AELU systems that move cargo from the deck subsystem onto the elevator subsystem and/or move cargo from the elevator subsystem onto the deck subsystem. In some embodiments, there may be multiple deck subsystems. For example, there may be a left deck subsystem and a right subsystem with the left deck subsystem and right subsystem being adjacent to each other and each having one side adjacent to an elevator. The left deck subsystem may have a corresponding left elevator subsystem on the elevator and the right deck subsystem may have a corresponding right elevator subsystem on the elevator. In such embodiments, one side, e.g., the left side, may be used for loading cargo onto the elevator subsystem and the other side, e.g., the right side, may be used for unloading cargo from the elevator subsystem. In some embodiments, the elevator may contain elevator doors on opposite sides of each other with at least one deck subsystem on each deck side of the elevator doors. In such embodiments, at least one deck subsystem on one side of the elevator may be used for loading cargo onto the elevator subsystem and at least one deck subsystem on the other side of the elevator may be used for unloading cargo from the elevator subsystem. In some embodiments, both the left deck subsystem and right deck subsystem may be used for loading or unloading simultaneously, e.g., for large loads.

One or more deck subsystems may be present on multiple vertical (and/or horizontal) decks/levels. The deck subsystems may not be the same at each level and cargo may enter and exit the elevator in different places or locations. For example, a first level may have a left deck subsystem and right deck subsystem on one side of an elevator, a second level may have a left deck subsystem and right deck subsystem on the opposite side of the elevator, a third level may have one deck subsystem on both sides of the elevator, and a fourth level may have no deck subsystem, e.g., used for manual loading and unloading only. The elevator may stop at multiple floors for loading or unloading and may not stop at every level.

Figure 1A:
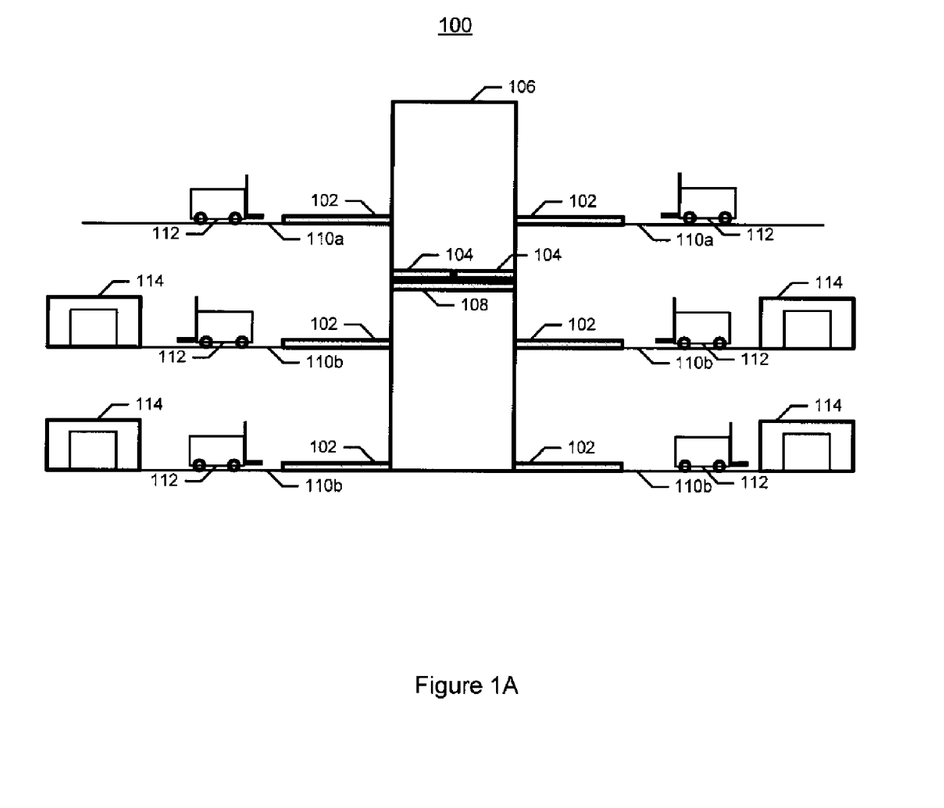
FIG. 1A is a block diagram of an automated elevator loading and unloading system in accordance with an exemplary embodiment.
Figure 1B:
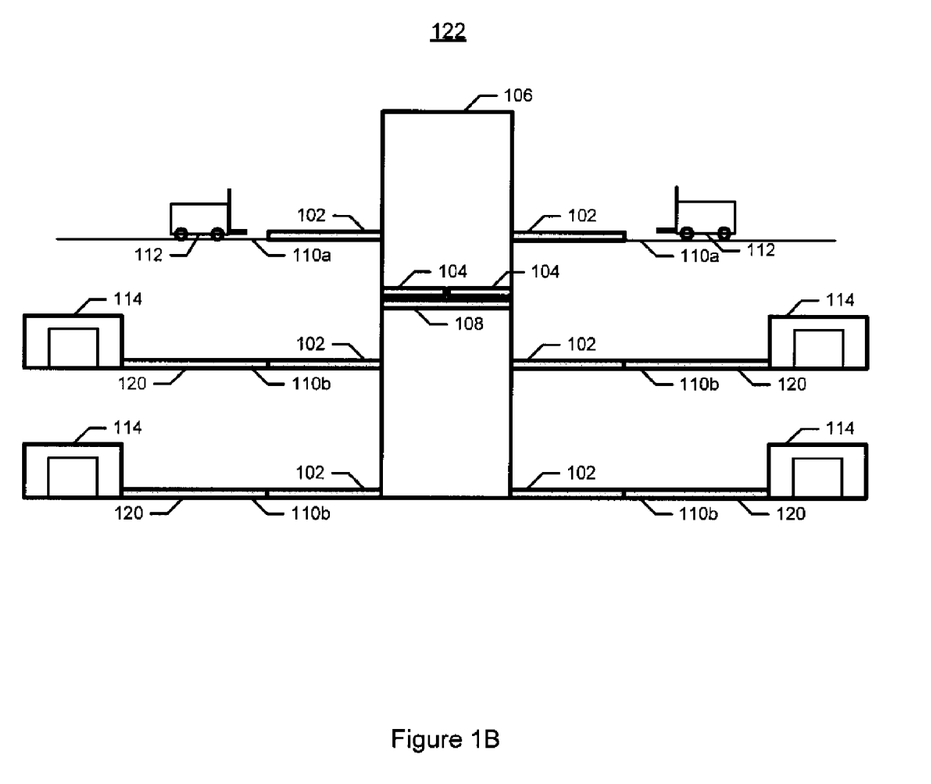
FIG. 1B is a block diagram of an automated elevator loading and unloading system operatively coupled with an Automated Storage and Retrieval System (ASKS) in accordance with an exemplary embodiment.

Referring to FIGS. 1A and 1B, block diagrams of an automated elevator loading and unloading system in accordance with an exemplary embodiment are illustrated. It is noted that the AELU system 100 is a simplified view and may include additional components that are not depicted. As shown, the AELU system 100 may have a deck side, e.g., a deck subsystem 102, and an elevator side, e.g., an elevator subsystem 104, on one or more deck levels. The deck subsystem 102 may be positioned outside of an elevator trunk 106 (e.g., an elevator shaft). As shown, a first deck subsystem 102 may be positioned on one side of the elevator, e.g., a loading side, and a second deck subsystem 102 may be positioned on the other side of the elevator, e.g., an unloading side. In some embodiments, either side could be loading or unloading. In yet other embodiments, each or both of the first and second deck subsystems 102 may be used for loading and/or unloading. The first deck subsystem 102 and second deck subsystem 102 may be positioned adjacent to each elevator door, respectively. A deck subsystem 102 may allow one or more operators to preposition cargo outside of an elevator prior to loading the elevator during intake, may assist in loading cargo onto the elevator during loading, and may assist in unloading cargo from the elevator during unloading. In yet other embodiments, the elevator subsystem 104 may have a door on only one side of the elevator, e.g., the left side shown in FIG. 1A, and one deck subsystem 102, e.g., the first deck subsystem 102 shown in FIG. 1A, may be used for both loading and unloading.

The elevator subsystem 104 may be positioned inside of the elevator trunk 106. For example, the elevator subsystem 104 may be positioned on top of or may be part of the elevator platform 108 or on top of the floor of an elevator. The deck subsystem 102 may be positioned on a floor of a building or on a deck of a ship 110. For example, in a ship, the deck subsystem 102 may be positioned on an exposed deck 110a at a top level or on a storeroom deck 110b at one or more bottom levels. Thus, a deck subsystem 102 may be an exterior deck subsystem 102 where the deck subsystem 102 may be exposed to the weather or may be an interior deck subsystem 102 where the deck subsystem 102 is not exposed to the weather.

As shown in FIG. 1A, materiel handling equipment 112 may assist in moving loads on and off of the deck subsystem 102. Materiel handling equipment 112 may include, but is not limited to, forklifts, pallet jacks, hand trucks, and other equipment that can assist in moving cargo from one location to another location. Ramps or collapsible ramps may be positioned adjacent to the sides of the deck subsystem 102 (or at other locations) and may assist the materiel handling equipment 112 in loading and/or unloading a deck subsystem 102. The cargo may be moved to and from automated storage equipment 114, which may or may not be automated, and may be, but not limited to, storage racks and/or other storage devices.

As shown in FIG. 1B, an AELU system 122 may be operatively coupled to an Automated Storage and Retrieval System (ASRS) 114. The AELU system 122 in FIG. 1B is similar to the AELU system 100 shown in FIG. 1A with the same reference numbers referring to the same or like parts. In FIG. 1B, the AELU system 122 may interact with an automated cargo system interface, such as an Automatic Transfer Mechanism (ATM) 120. For example, on a ship, the ASRS 114 and ATM 120 may be controlled by a Warehouse Management System (WMS) (not shown). In such a system, the ATM 120 may move loads to and from the deck subsystems 102 automatically and/or may move loads to and from the automated storage equipment 114 on one or more storeroom decks 110b. For example, a powered roller ball ATM 120 may be used to interface the AELU system 122 with the ASRS system 114. For AELU system 122 operatively coupled to an ASRS 114, a single controller may automatically control the operation of the components of the AELU system 122, the ATM 120, and the ASRS 114. In such embodiments, one or more sensors (discussed below) may be used to control the loading and unloading of cargo. Any other type of automated cargo system other than an ASRS 114 may be used as well.

Figure 2A:
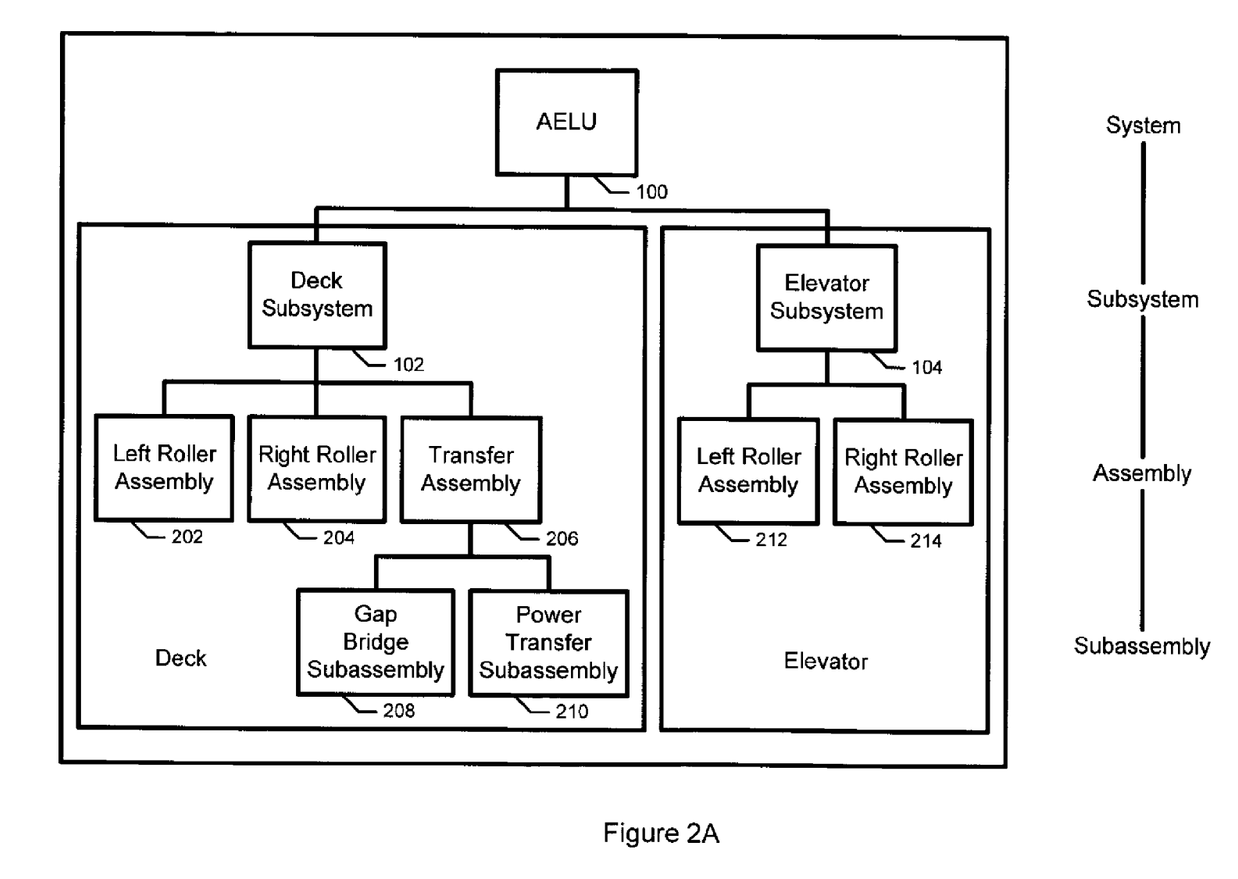
FIG. 2A is a block diagram showing the different layers of an automated elevator loading and unloading system in accordance with an exemplary embodiment.

Referring to FIG. 2A, a block diagram of an automated elevator loading and unloading system in accordance with an exemplary embodiment is illustrated. As shown, the AELU system 100 may include a deck subsystem 102 and an elevator subsystem 104. The deck subsystem 102 may include one or more roller assemblies, e.g., a left roller assembly 202 and a right roller assembly 204, and a transfer assembly 206. The transfer assembly 206 may include a subassembly level which may include a gap bridge subassembly 208 and a power transfer subassembly 210.

The transfer assembly 206 may assist in providing support for cargo over a gap between the deck subsystem 102 and the elevator subsystem 104. The gap bridge subassembly 208 may include a gap bridge 316 and a strut 318 (shown in FIG. 3). The strut 318 may assist in the lowering and raising of the gap bridge 316 prior to and after the loading and/or unloading of cargo between the deck subsystem 102 and elevator subsystem 104. The power transfer subassembly 210 may transfer mechanical power from a motor 306 (shown in FIG. 3) to the roller assemblies on the deck subsystem 102, and to the adjoining roller assemblies on the elevator subsystem 104 through one or more corresponding driveshafts, such as deck driveshaft 310 and/or telescoping driveshaft 314 (shown in FIG. 3).

Figure 2B:
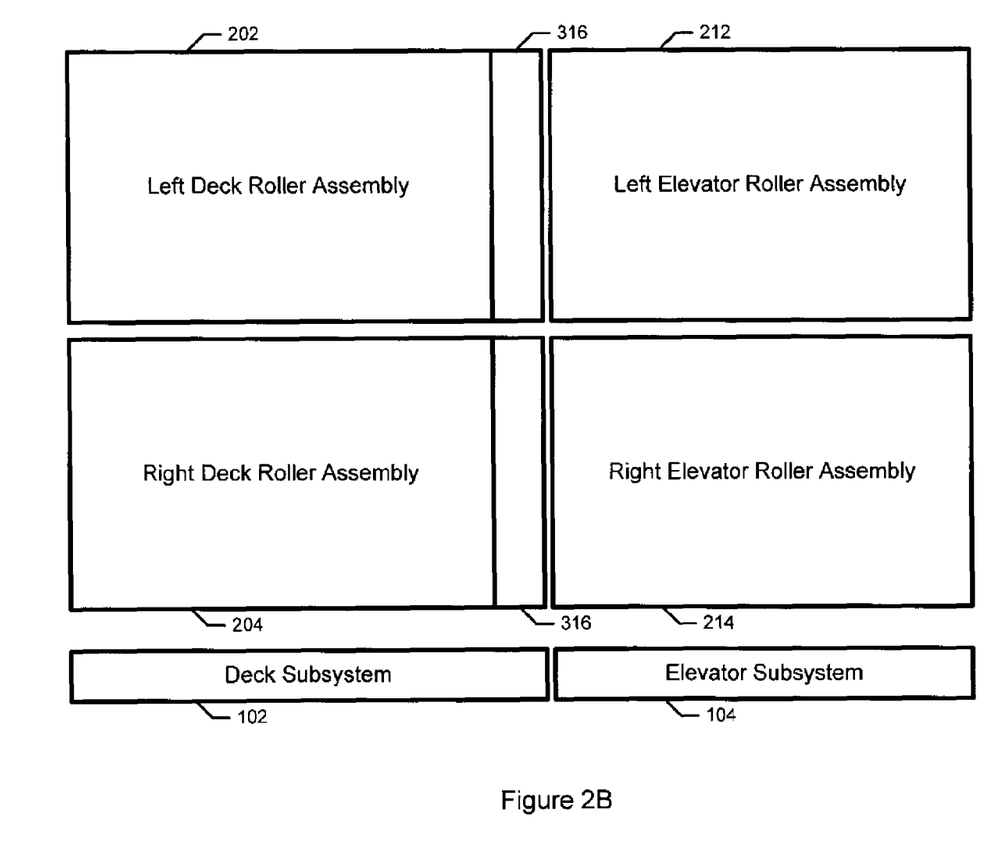
FIG. 2B is a block diagram of deck subsystems and elevator subsystems in accordance with an exemplary embodiment.

Referring to FIG. 2B, a block diagram of a deck subsystem and an elevator subsystem in accordance with an exemplary embodiment is illustrated. As shown, the deck subsystem 102 may comprise a left deck roller assembly 202 and a right deck roller assembly 204 adjacent to each other and each having a side facing an elevator door (not shown). The elevator subsystem 104 may comprise a left deck roller assembly 212 and a right deck roller assembly 214 adjacent to each other and each having a side facing the elevator door (not shown). The left deck roller assembly 202 and right deck roller assembly 204 may each include a gap bridge subassembly having a gap bridge 316 and a power transfer subassembly 210. The gap bridges 316, when lowered, may span the gaps between the deck roller assemblies 202, 204 and the corresponding elevator roller assemblies 212, 214.

In the AELU system 100 having a deck subsystem 102 having a left roller assembly 202 and a right roller assembly 204, one roller assembly may be used for loading cargo onto an elevator and the other roller assembly may be used for unloading cargo from an elevator subsystem 104. Although the AELU system 100 is described with left roller assemblies 202, 212 and right roller assemblies 204, 214, the AELU system 100 can have more or less roller assemblies.

Figure 3:
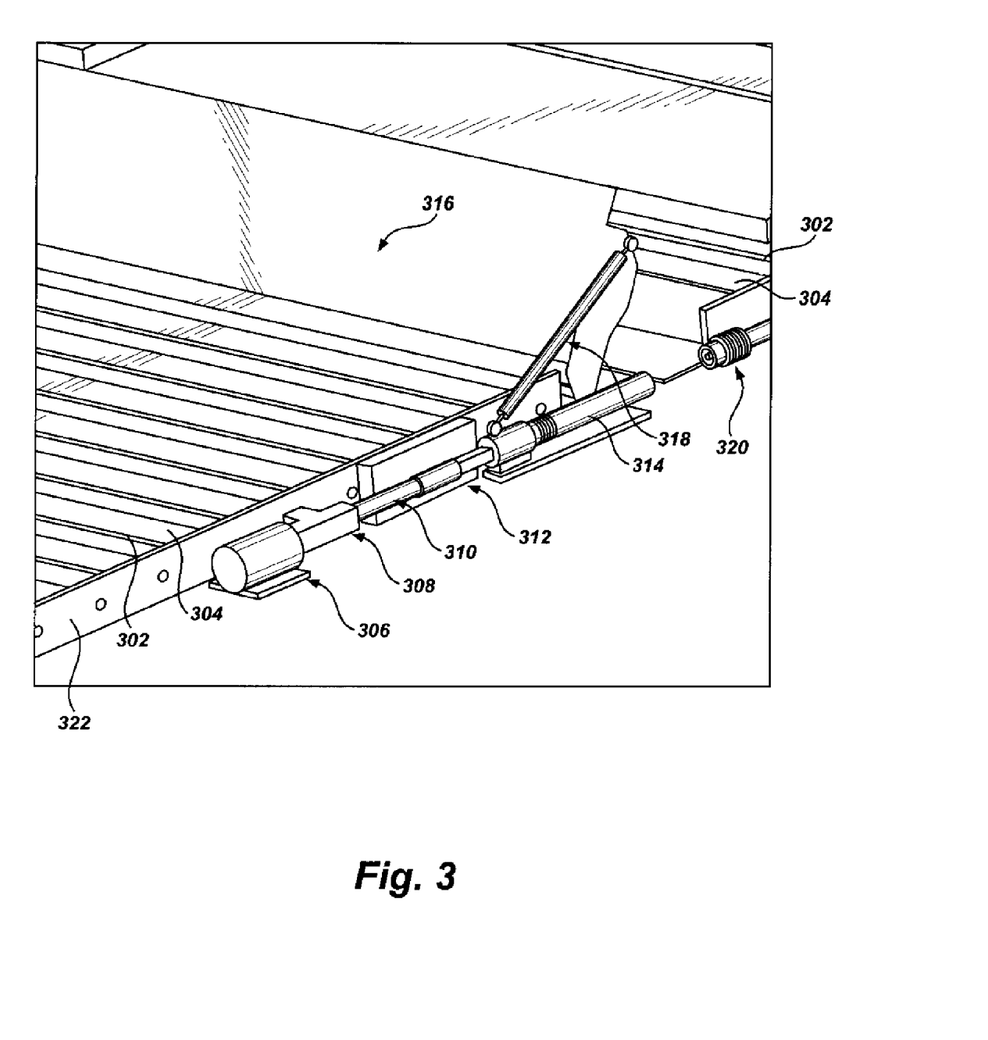
FIG. 3 is a diagram of a power transmission for a deck subsystem and elevator subsystem in accordance with an exemplary embodiment.

Referring to FIG. 3, an isometric view of a deck subsystem and elevator subsystem in accordance with an exemplary embodiment is illustrated. Each roller assembly may include a plurality of rollers 302 interposed between a plurality of plates 304 with the rollers 302 partially extending above the plates 304. The rollers 302 may be cylindrical rollers. The rollers 302 may be hollow. The rollers 302 may be made of steel, aluminum, and/or any other suitable material. The plates 304 may be I-beams. The plates may be made of steel, aluminum, and/or any other suitable material.

Each deck subsystem 102 may include a roller assembly and a motor 306, e.g., an electric motor, which is operatively coupled to the rollers 302 and may drive the rollers 302. The motor 306 may be operatively coupled to the rollers 302 via a gearbox 308, e.g., a "T" gearbox and/or a non-backdriveable gearbox. The motor 306 may drive the gearbox 308 which in turn drives the rollers 302. For example, the gearbox 308 may drive a driving sprocket (not shown) which is operatively coupled to a chain (not shown) that drives sprockets attached to each of the rollers 302. A guard 322 may cover the chain and sprockets.

The gearbox 308 may be operatively coupled to and drive a deck driveshaft 310. The deck driveshaft 310 may be operatively coupled to and drive a telescoping driveshaft 314. When the telescoping driveshaft 314 extends and is driven, the telescoping driveshaft 314 may operatively couple to and drive an elevator driveshaft 320. The elevator driveshaft 320 may be coupled to and drive a gearbox or elevator gearbox (not shown). The elevator gearbox may be operatively coupled to and drive rollers 302 on the elevator subsystem 104. Thus, when the motor 306 is activated, the motor 306 may drive rollers 302 on the deck subsystem 102 and rollers 302 on the elevator subsystem 104. For example, to drive the rollers 302 on the deck subsystem 102, the motor 306 may drive the gearbox 308 which may drive a drive sprocket which may drive a chain which may drive sprockets which may drive the rollers 302. To drive the rollers 302 on the elevator subsystem 104, the motor 306 may drive the gearbox 308 which may drive the deck driveshaft 310 which may drive the telescoping driveshaft 314 which may drive the elevator driveshaft 320 which may drive the elevator gearbox which may drive a drive sprocket which may drive a chain which may drive sprockets which may drive the rollers 302.

The deck driveshaft 310 may be operatively coupled to a linear actuator 312. The linear actuator 312 may extend and retract a strut 318, e.g., a bridge lifting strut. The strut 318 may be operatively coupled to a gap bridge 316. The strut 318 may raise and lower the gap bridge 316. When lowered, the gap bridge 316 may span the gap between the deck subsystem 102 and elevator subsystem 104, e.g., the space which is occupied by one or more elevator doors when the elevator doors are closed. The linear actuator 312 may be operatively coupled to the telescoping driveshaft 314 and cause the telescoping driveshaft 314 to extend and retract (for engaging and disengaging with the elevator roller driveshaft 320). The raising and/or lowering of the gap bridge 316 and the extending and retracting of the telescoping driveshaft 314 may occur together at about the same time, e.g., simultaneously, or may occur at different times.

Each deck subsystem 102 may include a roller assembly, a motor 306, a gearbox 308, a deck driveshaft 310, a linear actuator 312, a telescoping driveshaft 314, a gap bridge 316, and a strut 318. Each elevator subsystem 104 may include a roller assembly, an elevator driveshaft 320, and a gearbox. In alternate embodiments, some or all of the components of the deck subsystem 102 and elevator subsystem 104 may be switched. However, due to limited space and/or facilities within an elevator, it should be appreciated that the elevator subsystem 104 should include less components, and may not require electrical power.

One or more controllers (not shown) may control the operation of each deck subsystem 102 and elevator subsystem 104. For example, a controller may be communicatively coupled to one or more deck subsystems 102 and may control the loading and unloading jog cycles discussed below. In some embodiments, a single controller may control one or more deck subsystems 102 positioned on that deck or floor. The controller may be wired to the deck subsystems 102 (e.g., mounted to a wall external to the elevator or as part of a controller for the elevator) or wirelessly coupled to the deck subsystems 102. In other embodiments, one or more controllers may control deck subsystems 102 positioned on multiple deck levels.

In response to an operator command, the controller may send a signal to the motor 306 to start and thereby cause the rollers on an operatively coupled deck subsystem 102 to rotate. In response to another command, when an elevator arrives and the doors open, the linear actuator 312 may cause the gap bridge 316 to be lowered and/or may cause the telescoping driveshaft 314 to extend and engage the elevator driveshaft 320, thus causing the rollers on the elevator subsystem 104 to rotate. One or more other mechanisms (not shown) for extending and/or retracting the telescoping driveshaft 314 may also be included. The starting and stopping of the rotation of the rollers may be controlled by an operator interacting with the controller or may be automated. For example, for an automated operation, the rollers may rotate for a specified number of rotations thus moving cargo from one position to another position, e.g., from a deck subsystem 102 to an elevator subsystem 104. Input from one or more sensors (discussed below) may be used to assist in controlling a deck subsystem 102 and an elevator subsystem 104 in the loading and unloading of cargo.

Cargo movement between deck levels on a ship may fall into one of three categories: strike-down operation, strike-up operation, and shuffling materiel operation. A strike-down operation comprises moving cargo that has been placed on a ship's topside deck by external means, such as vertical replenishment or connected replenishment, and transferring the cargo to store rooms in the ship's holds. A strike-up operation comprises moving cargo that is pulled from the store rooms and is moved to the topside deck for offloading or consumption. A shuffling materiel operation comprises shuffling materiel between decks which may be done in preparation for a strike-up or strike-down operation to organize cargo in a manner that makes the strike-up or strike-down operation more efficient. Regardless of the operation, cargo movement in relation to the AELU system may be broken into two categories: loading cargo and unloading cargo. Loading cargo comprises loading or placing cargo in the elevator from the deck. Unloading cargo comprises unloading or moving cargo from the elevator platform onto the deck. To support these two operations, a jog cycle may be performed on the deck subsystem 102.

A jog cycle may move cargo from a first position, on a deck subsystem 102 or an elevator subsystem 102, to another position. For example, cargo may be placed on a first end of a deck subsystem 102, e.g., an end farthest from an elevator, and moved to a second end of the deck subsystem 102, e.g., an end closest to an elevator. Although the exemplary embodiments discussed below in FIGS. 4A-4L are directed towards an AELU system 100 having a first deck subsystem 102 on one side of an elevator subsystem 104 and a second deck subsystem 102 on the opposite side of the elevator subsystem 104 with each subsystem being able to handle rows of cargo two pallets deep. Other embodiments are not limited to such embodiments and may have different configurations. For example, in other exemplary embodiments, an elevator may only have doors on one side of the elevator, thus there may be two deck subsystems 102, e.g., a left deck subsystem 102 and a right deck subsystem 102, positioned outside of the elevator with corresponding elevator subsystems 104, e.g., a left elevator subsystem 104 and a right elevator subsystem 104, positioned within the elevator. In the following exemplary embodiments, the ends on the deck subsystem 102 that are farthest from the elevator are referred to as the forklift interface ends, the ends on the deck subsystem 102 that are closest to the elevator doors are referred to as the elevator interface ends, the end on the left side of the elevator subsystem 104 is referred to as the loading end, and the end on the right side of the elevator subsystem 104 is referred to as the unloading end.

Figure 4A:
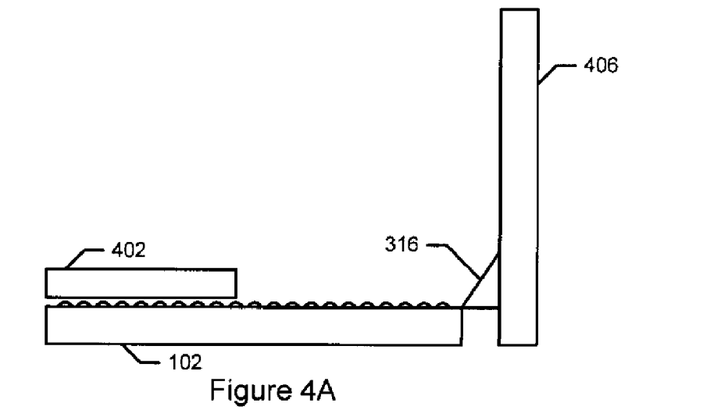
FIGS. 4A-4C are diagrams of a load cycle for the deck subsystem in accordance with an exemplary embodiment.
Figure 4B:
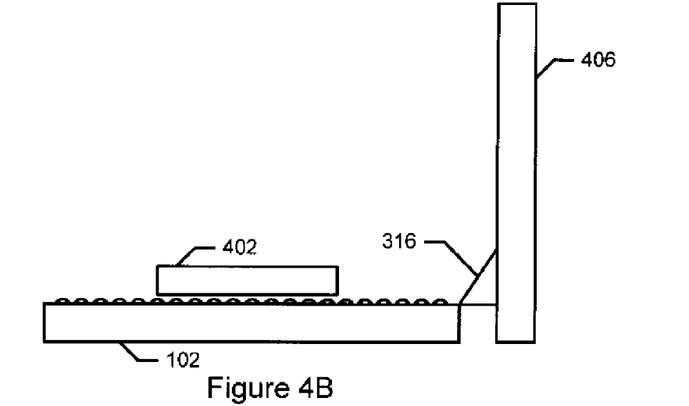
Figure 4C:
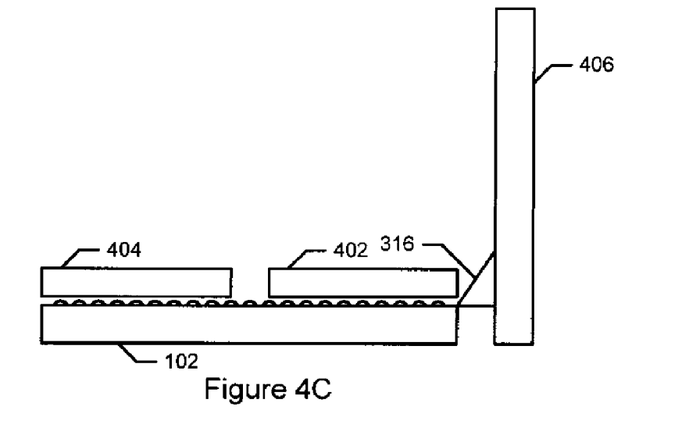

Referring to FIGS. 4A-4C, diagrams of a full load jog cycle for the deck subsystem 102 in accordance with an exemplary embodiment are illustrated. As shown in FIG. 4A, a first cargo load 402 may be loaded on a forklift interface end of a deck subsystem 102. For example, materiel handling equipment 112, e.g., a forklift, may load a first pallet 402 on the forklift interface end of the deck subsystem 102. As shown in FIG. 4B, the powered roller assembly may move the first cargo load 402 from the forklift interface end of the deck subsystem 102 to the elevator interface end of the deck subsystem 102 near elevator doors 406. As shown in FIG. 4C, a second cargo load 404 may be loaded onto the forklift interface end of the deck subsystem 102. For example, a forklift 112 may load a second pallet 404 onto the forklift interface end of the deck subsystem 102.

Figure 4D:
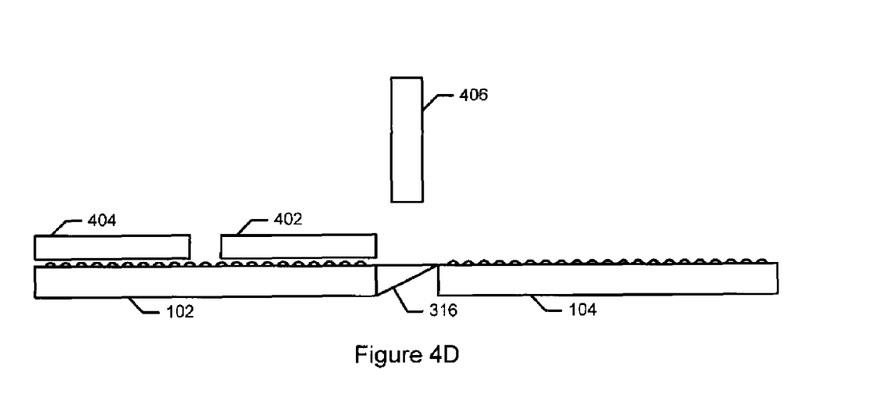
FIGS. 4D-4F are diagrams of a full load cycle for the elevator subsystem in accordance with an exemplary embodiment.
Figure 4E:
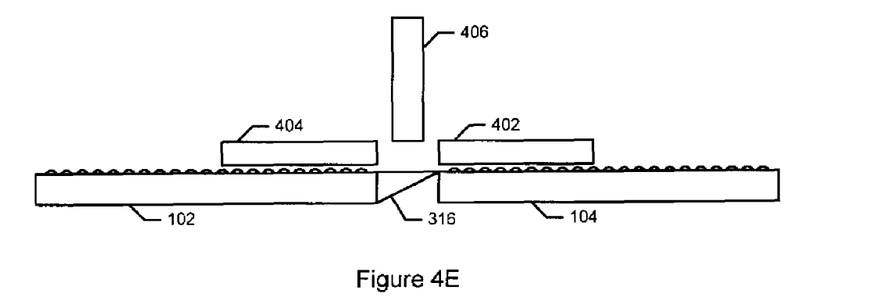
Figure 4F:
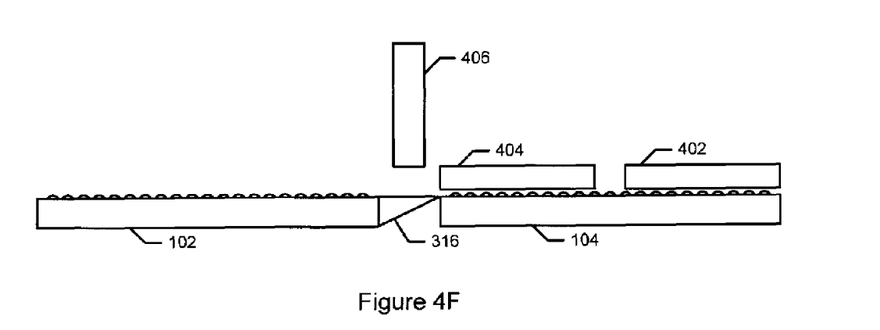

Referring to FIGS. 4D-4F, diagrams of a full load cycle for the elevator subsystem 104 in accordance with an exemplary embodiment are illustrated. As shown in FIG. 4D, a full load, e.g., the first cargo load 402 and second cargo load 404, may be on the deck subsystem 102. As shown in FIG. 4E, the deck subsystem 102 and elevator subsystem 104 may move the first cargo load 402 from the deck subsystem 102 onto the elevator subsystem 104 and the deck subsystem 102 may move the second cargo load 404 from the forklift interface end of the deck subsystem 102 to the elevator interface end of the deck subsystem 102. As shown in FIG. 4F, the elevator subsystem 104 may move the first cargo load 402 from the loading end of the elevator subsystem 104 to the unloading end of the elevator subsystem 104, and the deck subsystem 102 and the elevator subsystem 104 may move the second cargo load 404 from the elevator end of the deck subsystem 102 to the loading end of the elevator subsystem 104.

Figure 4G:
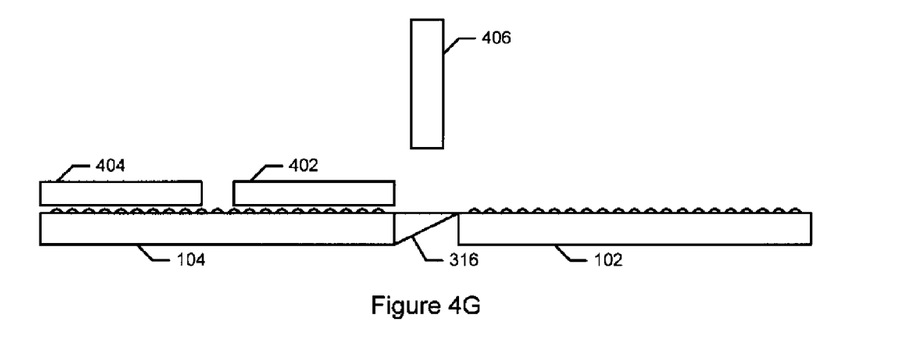
FIGS. 4G-4I are diagrams of a full unload cycle for the elevator subsystem in accordance with an exemplary embodiment.
Figure 4H:
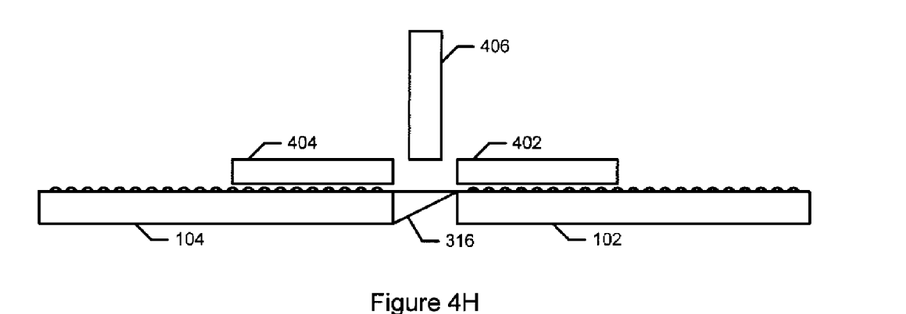
Figure 4I:
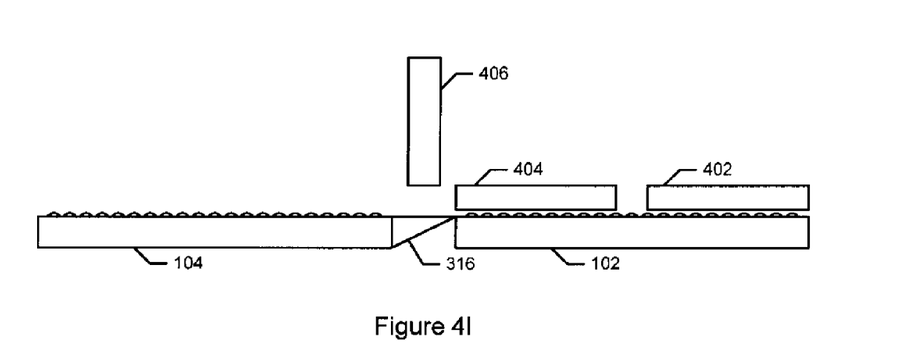

Referring to FIGS. 4G-4I, diagrams of a full unload cycle for the elevator subsystem 104 in accordance with an exemplary embodiment are illustrated. As shown in FIG. 4G, a full load, e.g., the first cargo load 402 and second cargo load 404, may be on the elevator subsystem 104. As shown in FIG. 4H, the elevator subsystem 104 and the deck subsystem 102 move the first cargo load 402 from the unloading end of the elevator subsystem 104 to the elevator end of the deck subsystem 102 and the elevator subsystem 104 moves the second cargo load 404 from the loading end of the elevator subsystem 104 to the unloading end of the elevator subsystem 104. As shown in FIG. 4I, the deck subsystem 102 moves the first cargo load 402 from the elevator end of the deck subsystem 102 to the forklift interface end of the deck subsystem 102 and the elevator subsystem 104 and the deck subsystem 102 move the second cargo load 404 from the unloading end of the elevator subsystem 104 to the elevator end of the deck subsystem 102.

Figure 4J:
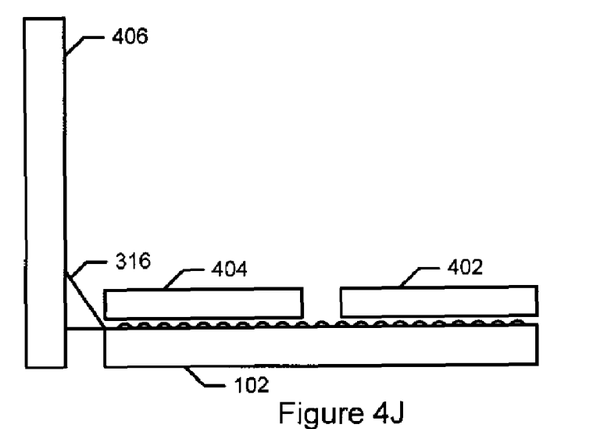
FIGS. 4J-4L are diagrams of an unload cycle for the deck subsystem in accordance with an exemplary embodiment.
Figure 4K:
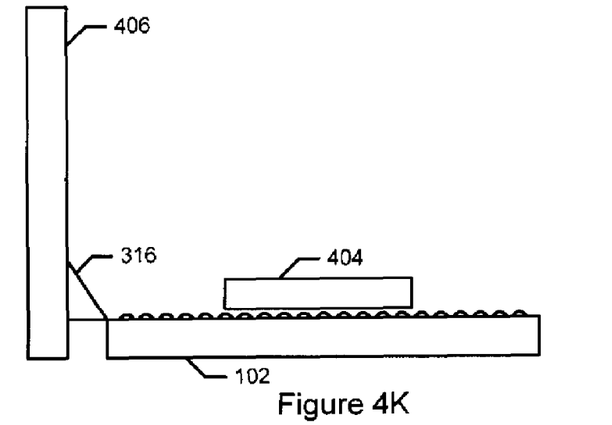
Figure 4L:
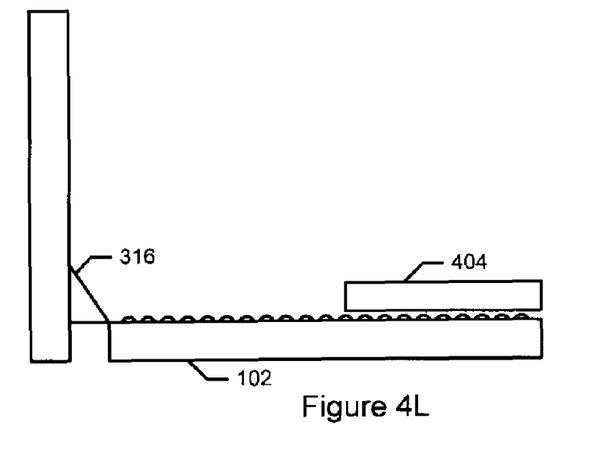

Referring to FIGS. 4J-4L, diagrams of a full unload cycle for the deck subsystem 102 in accordance with an exemplary embodiment are illustrated. As shown in FIG. 4J, the first cargo load 402 may be unloaded from the deck subsystem 102. For example, materiel handling equipment, e.g., a forklift 112, may unload the first pallet 402 on the forklift interface end of the deck subsystem 102. As shown in FIG. 4K, powered rollers may move the second cargo load 404 from the elevator interface end of the deck subsystem 102 to the forklift interface end of the deck subsystem 102. As shown in FIG. 4L, the second cargo load 404 may be ready to be unloaded at the forklift interface end of the deck subsystem 102. For example, a forklift 112 may unload the second pallet 404 from the deck subsystem 102.

Figure 5:
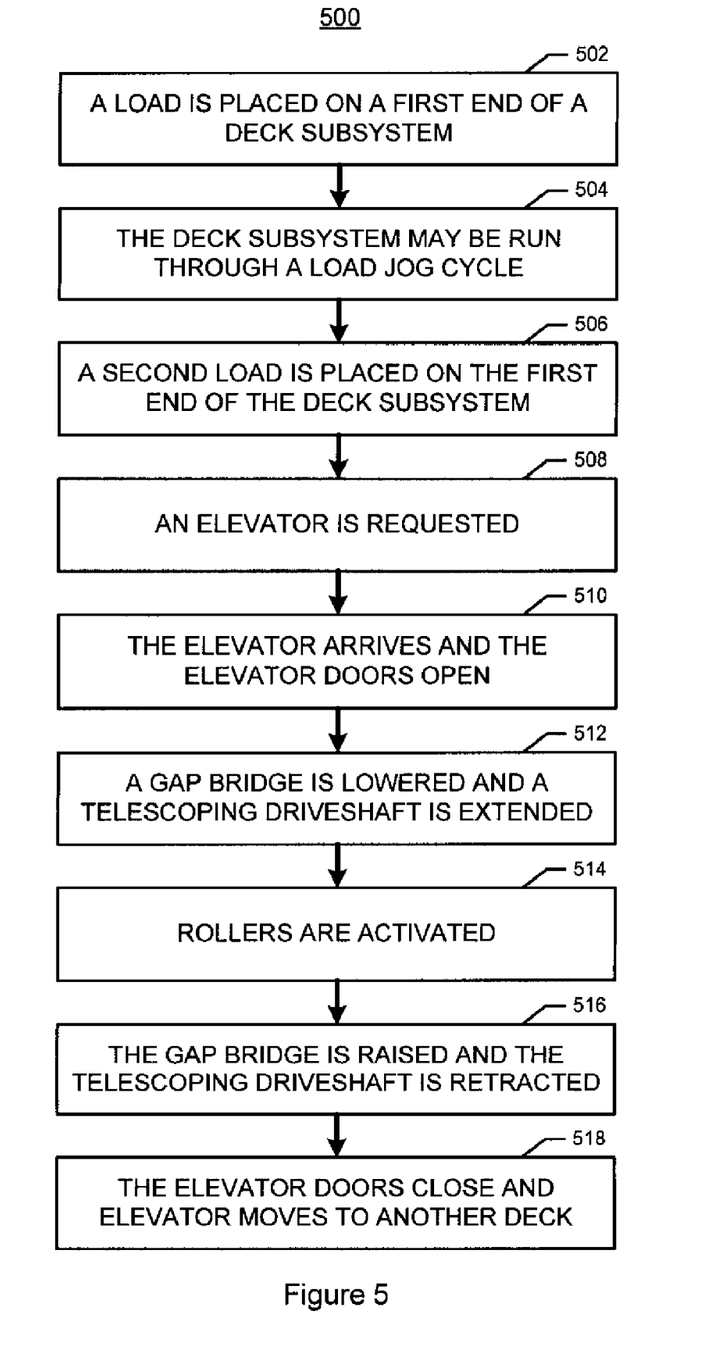
FIG. 5 is a flowchart of a cargo load cycle in accordance with an exemplary embodiment.

Referring to FIG. 5, a flow diagram of a method 500 for a load cycle in accordance with an exemplary embodiment is illustrated. This exemplary method 500 is provided by way of example, as there are a variety of ways to carry out the method. The method 500 shown in FIG. 5 can be executed or otherwise performed by one or a combination of various systems. The method 500 described below may be carried out by the AELU systems 100 or 122 shown in FIGS. 1-4 by way of example, and various elements of FIGS. 1-4 are referenced in explaining exemplary method 500 of FIG. 5. Each block shown in FIG. 5 represents one or more processes, methods, or subroutines carried out in exemplary method 500. Referring to FIG. 5, exemplary method 500 may begin at block 502.

At block 502, a first cargo load may be placed onto a first end of the deck subsystem. For example as shown in FIG. 4A, a forklift 112 may load a pallet 402 onto the forklift interface end of the deck subsystem 102.

At block 504, the deck subsystem may be run through a load jog cycle. For example as shown in FIG. 4B, an operator, e.g., a forklift operator, using a controller, may run a load jog through cycle which moves the first pallet 402 to the elevator interface end of the deck subsystem 102.

At block 506, the now empty first end of the deck subsystem may be loaded with another load. For example as shown in FIG. 4C, a forklift 112 may load a second pallet 404 onto the forklift interface end of the deck subsystem 102.

At block 508, after the deck subsystem is fully loaded, an elevator may be requested. For example, an operator, e.g., a forklift 112 operator, using a controller, may request an elevator and may enter the deck for which the cargo 402, 404 is to be delivered.

At block 510, the elevator may arrive and the doors open. The elevator may be checked to determine if the elevator is empty and the door is open. For example, an "elevator door open" sensor may be activated, along with a series of thru beam sensors to verify that the elevator is empty, which sends a trigger signal to the system to begin a load sequence. If the elevator is not empty, only a portion of the cargo waiting to be loaded may be loaded.

At block 512, the gap bridge may be lowered and the telescoping driveshaft may extend to the elevator roller driveshaft. Preferably, the gap bridge 316 and power transfer to the driveshaft occur approximately at the same time, e.g., simultaneously. One or more sensors may determine if the gap bridge 316 is fully lowered and the telescoping driveshaft 314 positively engages the elevator roller driveshaft 320. A safety mechanism may be incorporated into both subsystems to stop motion should the drives timeout, or draw excessive current indicating an interference. If the gap bridge 316 does not fully lower and/or the driveshafts do not properly engage, an indicator may be triggered to notify a worker. For example, an alarm may sound and/or a light may flash.

At block 514, the roller motor may be activated, and the deck rollers and elevator rollers may be driven for a predetermined number of revolutions to move the cargo from the deck rollers to a corresponding position on the elevator rollers. For example, the motor 306 may be activated thereby driving the rollers of the deck subsystem 102 and the elevator subsystem 104. For a full load cycle as shown in FIGS. 4D-4F, the cargo loads 402, 404 may be loaded from the deck subsystem 102 onto the elevator subsystem 104. For a half load cycle as shown in FIGS. 4D and 4E, the first cargo load 402 may be loaded onto the elevator subsystem 104 and the second cargo load 404 may move from the forklift interface end of the deck subsystem 102 to the elevator interface end of the deck subsystem 102. Motor current monitors may control the cargo movements to stop the rollers in the event of a materiel collision. One or more sensors on the far end of the elevator platform 104 may stop the rollers in the event that the system attempts to overdrive the cargo into the elevator. One or more sensors may detect if any of the cargo is in the plane of the elevator door. If the cargo is in the plane of the elevator door, an indicator may be triggered to notify a worker. For example, an alarm may sound and/or a light may flash.

At block 516, the gap bridge may be raised and the telescoping elevator roller driveshafts may be retracted. Preferably the gap bridge 316 and the retraction of the telescoping driveshaft 314 occur approximately at the same time, e.g., simultaneously. In addition, the current draw can be monitored to ensure that the raising of the gap bridge 316 and retraction of the telescoping driveshaft 314 are operating properly.

At block 518, the elevator door may close and the elevator may travel to another deck level where the cargo is to be delivered. If the operator did not enter the destination deck, the operator may use the controller to enter the destination deck.

Figure 6:
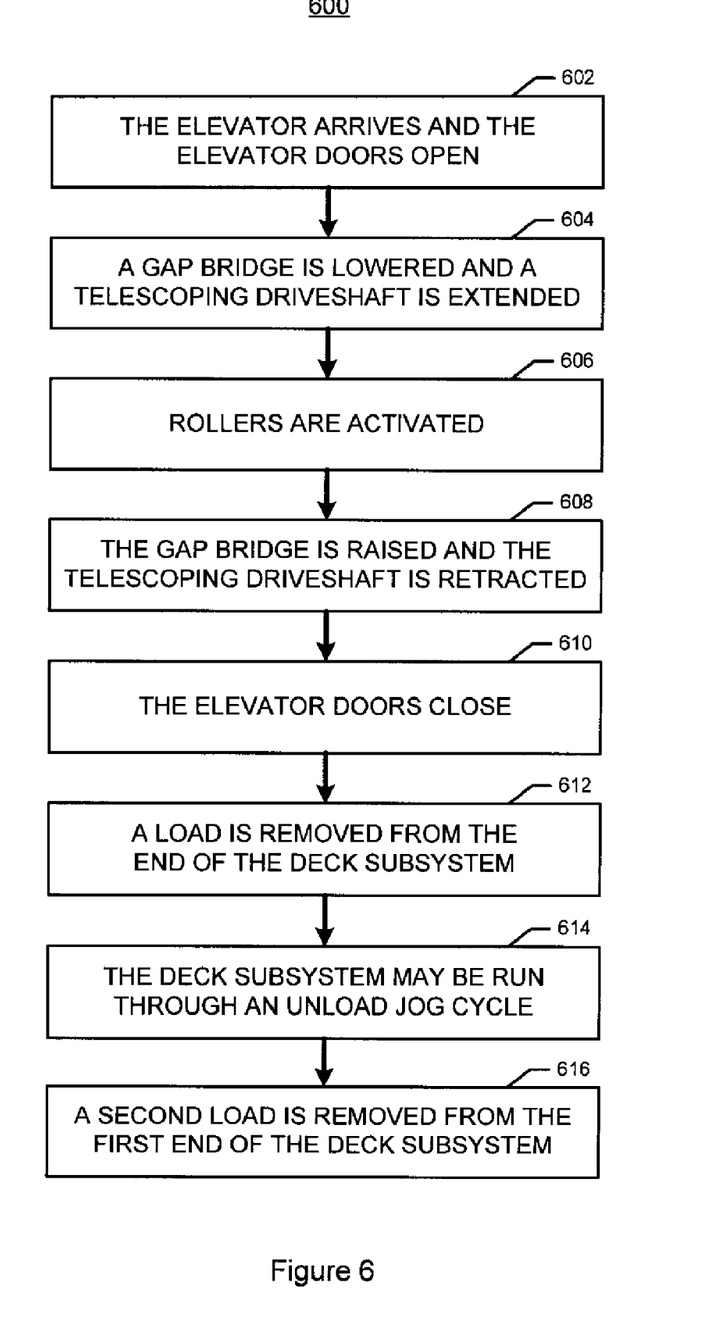
FIG. 6 is a flowchart of a unload cycle in accordance with an exemplary embodiment.

Referring to FIG. 6, a flow diagram of a method 600 for an unload cycle in accordance with an exemplary embodiment is illustrated. This exemplary method 600 is provided by way of example, as there are a variety of ways to carry out the method. The method 600 shown in FIG. 6 can be executed or otherwise performed by one or a combination of various systems. The method 600 described below may be carried out by the AELU systems 100 or 122 shown in FIGS. 1, 3, and/or 4 by way of example, and various elements of FIGS. 1-4 are referenced in explaining exemplary method 600 of FIG. 6. Each block shown in FIG. 6 represents one or more processes, methods, or subroutines carried out in exemplary method 600. Referring to FIG. 6, exemplary method 600 may begin at block 602.

At block 602, an elevator carrying cargo may arrive at a delivery deck and the elevator doors may open. One or more sensors may determine that the elevator doors 406 are opening. For example, "elevator door open" sensors may detect the elevator doors 406 opening. One or more sensors may determine if the deck subsystem 102 is empty.

At block 604, the gap bridge may be lowered and the telescoping driveshaft may extend to the elevator roller driveshaft. Preferably, lowering the gap bridge 316 and power transfer to the driveshaft occur approximately at the same time, e.g., simultaneously. One or more sensors may determine if the gap bridge 316 is fully lowered and the telescoping driveshaft 314 positively engaged the elevator roller driveshaft 320. A safety mechanism may be incorporated into both subsystems to stop motion should the drives timeout, or draw excessive current indicating an interference. If the gap bridge 316 does not fully lower and/or the driveshafts do not properly engage, an indicator may be triggered to notify a worker. For example, an alarm may sound and/or a light may flash.

At block 606, the roller motor may be activated, and the deck and elevator rollers may be driven for a predetermined number of revolutions to move the cargo from the deck rollers to a corresponding position on the elevator rollers. For example, the motor 306 may be activated thereby driving the rollers of the deck subsystem 102 and rollers of the elevator subsystem 104. For a full unload cycle as shown in FIGS. 4G-4I, the cargo loads 402 and 404 may be loaded from the elevator subsystem 104 onto the deck subsystem 102. For a half unload cycle as shown in FIGS. 4G and 4H, the first cargo load 402 may be unloaded onto the deck subsystem 102 and the second cargo load 404 may move from the loading side of the elevator subsystem 104 to the unloading side of the elevator subsystem 104. Motor current monitors control the cargo movements to stop the rollers in the event of a materiel collision. One or more sensors may detect if any of the cargo is in the plane of the elevator door. If the cargo is in the plane of the elevator door, an indicator may be triggered to notify a worker. For example, an alarm may sound and/or a light may flash.

At block 608, the gap bridge may be raised and the telescoping elevator roller driveshafts may be retracted. Preferably the gap bridge 316 and the retraction of the telescoping driveshaft 314 occur approximately at the same time, e.g., simultaneously. In addition, the current draw may be monitored to ensure that the raising of the gap bridge 316 and retraction of the telescoping driveshaft 314 are operating properly.

At block 610, the system may send a "close doors" signal to the elevator to close the elevator doors 406 and may move the elevator to another deck if called.

At block 612, the cargo at the forklift interface end of the deck subsystem may be unloaded. For example as shown in FIG. 4J, a forklift 112 may unload a cargo load 402 from the forklift interface end of the deck subsystem 102.

At block 614, the deck subsystem 102 may be run through an unload jog cycle. For example as shown in FIG. 4K, an operator, e.g., a forklift 112 operator, using a controller, may run an unload jog cycle which moves the pallet or cargo 404 from the elevator interface end of the deck subsystem 102 to the forklift interface end of the deck subsystem 102.

At block 616, the cargo at the forklift interface end of the deck subsystem 102 may be unloaded. For example as shown in FIG. 4L, a forklift 112 may unload the second cargo load 404 from the forklift interface end of the deck subsystem 102.

As described with respect to methods 500 and 600, the AELU system 100 may be able to load or unload in a selective manner. For example, in some embodiments, the rollers 302 may only be driven through a half load cycle. For a half load cycle, cargo positioned on an elevator interface end of a deck subsystem 102 may only be driven to the loading end of the elevator subsystem 104 rather than the unloading end of the elevator end of the elevator subsystem 104. For a half unload cycle, cargo positioned on an elevator subsystem 104 next to an elevator door, e.g., the loading end of the elevator subsystem 104, may only be driven to the elevator interface end of the deck subsystem 102 rather than to the forklift interface end of the deck subsystem 102.

As described with respect to methods 500 and 600, an automated elevator loading and unloading system may be controlled by an operator controlling the deck subsystems 102 and elevator subsystems 104 as well as controlling the elevator. A system may also be operatively coupled and interact with an ASRS as illustrated in FIG. 1B. In such an embodiment, the efficiency of the AELU system 122 and materiel throughput as a whole may be optimized since the AELU system 122 may coordinate materiel movement with the ASRS 114. The AELU system 122 may coordinate the loading and unloading of the AELU system 100 to maximize materiel throughput using methods 500 and 600. In such embodiments, the ASRS 114 may load and unload the deck subsystem 102 without the use of forklifts, through the use of an intermediate automated transfer system 120.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

What is claimed is:

1. A system comprising:
   an elevator subsystem positioned on an elevator with the elevator subsystem comprising a plurality of rollers, the elevator capable of moving between multiple deck levels; and
   a deck subsystem positioned on a deck and comprising:
      a plurality of rollers;
      a motor; and
      a gearbox operatively coupled to the motor and to the plurality of rollers on the deck subsystem, whereby the motor drives the gearbox which causes the plurality of rollers on the deck subsystem to rotate, whereby the rotation of the rollers assists in loading or unloading cargo to and from the elevator subsystem.

2. The system of claim 1 further comprising a telescoping driveshaft operatively coupled to the motor and in the event the telescoping driveshaft is in an extended position, the telescoping driveshaft is operatively coupled to an elevator driveshaft wherein the motor causes the elevator driveshaft to rotate which causes the plurality of rollers on the elevator subsystem to rotate thereby assisting in loading or unloading cargo to and from the elevator subsystem.

3. The system of claim 1 further comprising a gap bridge configured to span an opening between the deck subsystem and the elevator subsystem when the bridge is in a spanning position.

4. The system of claim 3 wherein the gap bridge further comprises a plurality of rollers to assist in loading and unloading cargo to and from the elevator subsystem.

5. The system of claim 3 further comprising at least one lifting strut operatively coupled to the gap bridge with the lifting strut assisting in raising and lowering the gap bridge.

6. The system of claim 1 wherein the deck subsystem further comprises a plurality of plates interposed between the rollers with the rollers extending at least partially above the plates.

7. The system of claim 1 wherein the elevator subsystem further comprises a plurality of plates interposed between the rollers with the rollers extending at least partially above the plates.

8. The system of claim 4 wherein the rollers partially extend above the gap bridge.

9. The system of claim 1 wherein two deck subsystems are positioned adjacent to each other with each having a side adjacent to an elevator door.

10. The system of claim 1 wherein two deck subsystems are positioned adjacent to each other with each having a side adjacent to a first elevator door and two deck subsystems are positioned adjacent to each other with each having a side adjacent to a second elevator door, with the first elevator door and the second elevator door being on opposite sides of each other.

11. The system of claim 1 wherein the cargo further comprises containerized or non-containerized materiel.

12. A method comprising:
    rotating a plurality of rollers on a deck subsystem to move cargo from a first end of the deck subsystem to a second end of the deck subsystem, with the deck subsystem positioned outside of an elevator;
    lowering a gap bridge to span a gap between the deck subsystem and an elevator subsystem, with the elevator subsystem positioned within an elevator and comprising a plurality of rollers, the elevator capable of moving between multiple deck levels; and
    rotating the rollers on the deck subsystem and the rollers on the elevator subsystem thereby moving the cargo from the deck subsystem over the gap bridge and onto the elevator subsystem, wherein rotating the rollers on the deck subsystem and the rollers on the elevator subsystem further comprises a motor driving a gearbox operatively coupled to the rollers on the deck platform and operatively coupled to a telescoping driveshaft and the telescoping driveshaft extending and operatively coupling with an elevator driveshaft operatively coupled to the rollers on the elevator platform.

13. The method of claim 12 further comprising raising the gap bridge and retracting the telescoping driveshaft.

14. The method of claim 13 further comprising moving the elevator from one deck level to another deck level.

15. The method of claim 12 wherein the cargo comprises containerized or non-containerized materiel.

16. A method comprising:
lowering a gap bridge to span a gap between a deck subsystem and an elevator subsystem, with the deck subsystem positioned outside of an elevator and comprising a plurality of rollers and the elevator subsystem positioned within an elevator and comprising a plurality of rollers, the elevator capable of moving between multiple deck levels; and
rotating rollers on the deck subsystem and the rollers on the elevator subsystem to move cargo from the elevator subsystem to the deck subsystem, wherein rotating the rollers on the deck subsystem and the rollers on the elevator subsystem further comprises a motor driving a gearbox operatively coupled to the rollers on the deck platform and operatively coupled to a telescoping driveshaft and the telescoping driveshaft extending and operatively coupling with an elevator driveshaft operatively coupled to the rollers on the elevator platform.

17. The method of claim 16 further comprising raising the gap bridge and retracting the telescoping driveshaft.

18. The method of claim 16 wherein the cargo comprises containerized or non-containerized materiel.

* * * * *